United States Patent [19]

Nakanishi

[11] Patent Number: 5,157,246
[45] Date of Patent: Oct. 20, 1992

[54] SPEED CONTROL FOR MANUAL SCANNING CARD READER/WRITER

[75] Inventor: Tomoyuki Nakanishi, Moriyama, Japan

[73] Assignee: Omron Corporation, Kyoto, Japan

[21] Appl. No.: 506,800

[22] Filed: Apr. 10, 1990

[30] Foreign Application Priority Data

Apr. 14, 1989 [JP] Japan .................. 1-44174[U]

[51] Int. Cl.⁵ .................. G06K 13/00; G06K 7/08; G11B 25/04
[52] U.S. Cl. .................. 235/482; 235/449; 360/2
[58] Field of Search ............ 235/439, 482, 437, 449, 235/480, 475; 360/2

[56] References Cited

U.S. PATENT DOCUMENTS

| | | | |
|---|---|---|---|
| 3,671,719 | 6/1972 | May | 235/480 |
| 3,704,360 | 11/1972 | McFadden | 235/480 |
| 3,731,061 | 5/1973 | Laybourn | 235/480 |
| 3,737,884 | 6/1973 | Wallace | 235/480 |
| 3,831,188 | 8/1974 | Zupancic et al. | 235/475 |
| 3,922,530 | 11/1975 | Zupancic | 360/2 |
| 3,976,858 | 8/1976 | Haun | 235/482 |
| 4,040,097 | 8/1977 | Mizuno | 235/437 |
| 4,152,584 | 5/1979 | Sato | 235/475 |
| 4,259,699 | 3/1981 | Yoshida | 360/2 X |
| 4,261,023 | 4/1981 | Hayashi | 235/449 |
| 4,406,629 | 9/1983 | Yeh | 360/2 X |
| 4,423,320 | 12/1983 | McPherson | 235/482 |
| 4,598,479 | 7/1986 | Baus | 360/2 X |
| 4,914,279 | 4/1990 | Massey | 235/449 |

FOREIGN PATENT DOCUMENTS 208003 10/1981 Fed. Rep. of Germany .
58-80775 5/1983 Japan .

Primary Examiner—Stuart S. Levy
Assistant Examiner—Christopher R. Glembocki
Attorney, Agent, or Firm—Dickstein, Shapiro & Morin

[57] ABSTRACT

A speed governor roller (10) is provided so as to face a magnetic head (4) which is supported so as to face a manual conveying path (20) of a magnetic card (7). One end of a speed governor spring (15) is attached to the peripheral surface of the speed governor roller (10). A flywheel (17) is interlocked with the speed governor roller (10). When the magnetic card (7) is manually scanned, the speed governor roller (10) also rotates by the frictional force with the magnetic card (7). However, when an angle of rotation of the roller (10) increases, the force of the spring (15) to return the speed governor roller (10) in the opposite direction also increases. Thus, an increase in scanning speed of the magnetic card (7) is lightened. A fluctuation in scanning speed of the magnetic card (7) is absorbed by the flywheel (17). Therefore, the reading/writing operation of the magnetic card (7) can be stably executed.

6 Claims, 2 Drawing Sheets

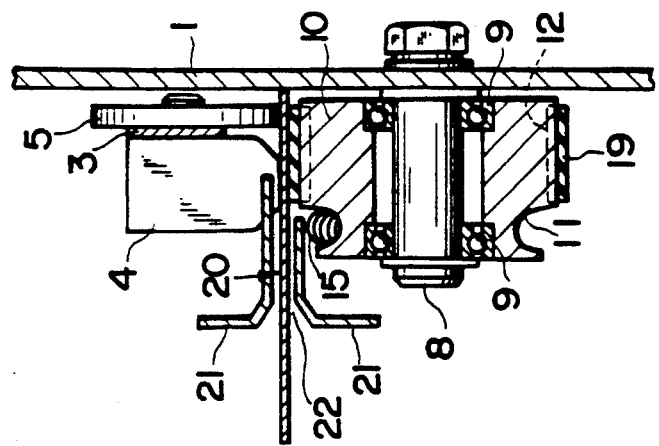
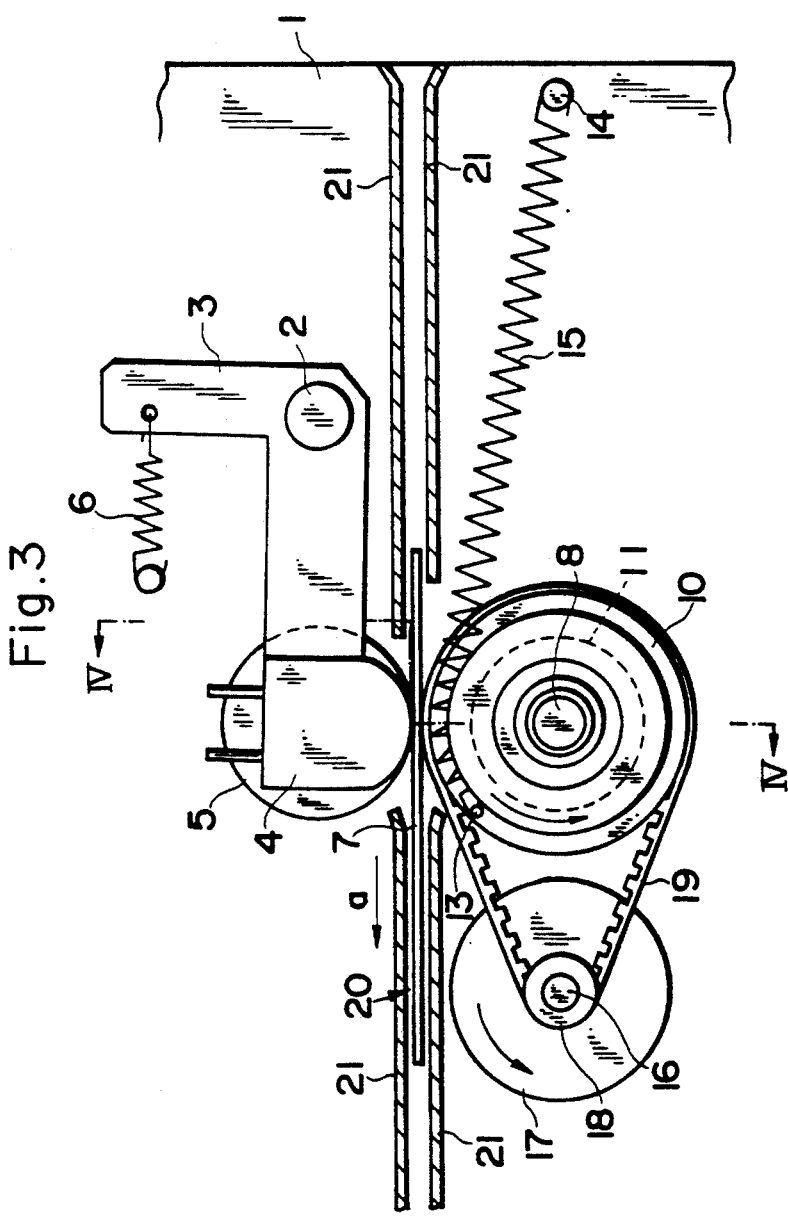

SPEED CONTROL FOR MANUAL SCANNING CARD READER/WRITER

BACKGROUND OF THE INVENTION

1. Field of the Invention

The present invention relates to a card reader/writer in which by manually conveying a magnetic card along a scanning groove, the magnetic card is scanned for a magnetic head.

In the specification, "card reader/writer" is used as a concept incorporating a card reader, a card writer, and a card reader and writer having both of the reading and writing functions.

2. Description of the Related Background Art

Hitherto, as a manual scanning type card reader/writer, there has been known a card reader/writer having the following structure.

That is, there has been known a manual scanning type card reader/writer comprising a magnetic head to write or read magnetic recording information onto/from a magnetic card and a rotatable roller which is arranged so as to face the magnetic head, wherein the magnetic card is manually conveyed between the magnetic head and the roller, the magnetic recording information is written or read onto/from a magnetic stripe of the magnetic card.

However, in the case of manually conveying the magnetic card, the moving speed of the magnetic card differs depending on the person using it. Such variances in moving speeds causes problems such that if the card moving speed is too fast, the magnetization of a magnetic medium (magnetic card) by the magnetic field which is generated in a gap of the magnetic head is insufficient. On the contrary, if the card moving speed is too slow, a writing error occurs, so that information cannot subsequently be read out of the magnetic card on which the information has been magnetically recorded.

The above problems also occur even in those cases where the moving speed of magnetic card by the manual operation largely fluctuates and where the moving speed of the magnetic card gradually increases. In general, there is a tendency that the moving speed of the magnetic card by the manual operation gradually increases.

SUMMARY OF THE INVENTION

It is an object of the present invention to provide a manual scanning type card reader/writer in which fluctuations in moving speeds of a magnetic card by the manual operation is suppressed. Fluctuation of speed is prevented so that the magnetic card is gradually fastly moved, and the magnetic reading/writing operation can be relatively stably executed.

A manual scanning type card reader/writer according to the invention comprises: a magnetic head which is supported to a position which faces a card conveying path so as to be freely forwardly or backwardly moved substantially perpendicular to the card conveying path and is pressed toward the card conveying path; a rotatable speed governor roller an outer circumference of which faces the magnetic head; and biasing means for a biasing the speed governor roller, when rotated in the card conveying direction due to frictional engagement with the magnetic card when the card is manually conveyed so that the speed governor roller is biased against further rotation in the card conveying direction. Preferably, the biasing force of the biasing means increases as the angle of rotation of the speed governor roller increases relative to the unengaged rest position of the speed governor roller.

When the magnetic card is manually conveyed between the magnetic head and the speed governor roller, the speed governor roller also rotates by frictional contact with the magnetic card. When the rotational angle of the speed governor roller increases from an unengaged position, the biasing means is elongated, thus increasing the amount of return force. As a result the return force on the speed governor roller in the opposite direction also increases causing, in effect, a braking of deceleration. Thus, an increase in manual conveying speed of the magnetic card is reduced by the braking action of the speed governor roller.

Preferably, a flywheel which is interlocked with the speed governor roller is provided, thus achieving a reduction in the amount of the fluctuation of the conveying speed of the magnetic card is As mentioned above, according to the invention, a fluctuation in the moving speed of the magnetic card by manual operation of the card can be suppressed by the flywheel and it is also possible to prevent by virtue the biasing means the ability to gradually increase the moving speed of magnetic card. As a result, magnetic recording information can be relatively stably read/written irrespective of an individual difference in speed imparted to the card by manual operation.

BRIEF DESCRIPTION OF THE DRAWINGS

The drawings show an embodiment of the present invention;

FIG. 3 is a vertical sectional view of a manual scanning type card reader/writer during the reading/writing operation; and FIG. 4 is a cross sectional view corresponding to FIG. 2.

DETAILED DESCRIPTION OF THE PREFERRED EMBODIMENT

An embodiment of the present invention will be described in detail hereinbelow with reference to the drawings.

Figure 2:
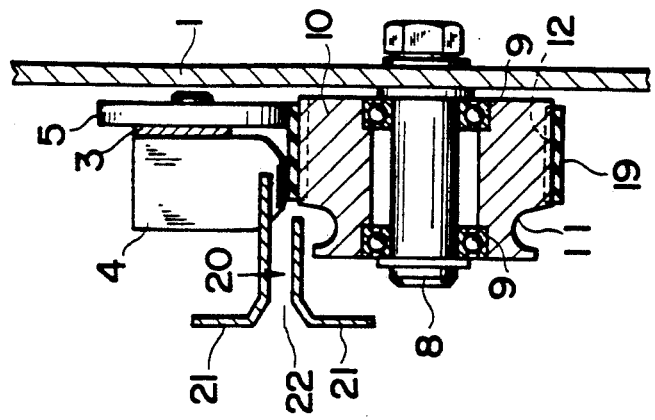
FIG. 2 is a cross sectional view taken along the line II—II in FIG. 1.
Figure 1:
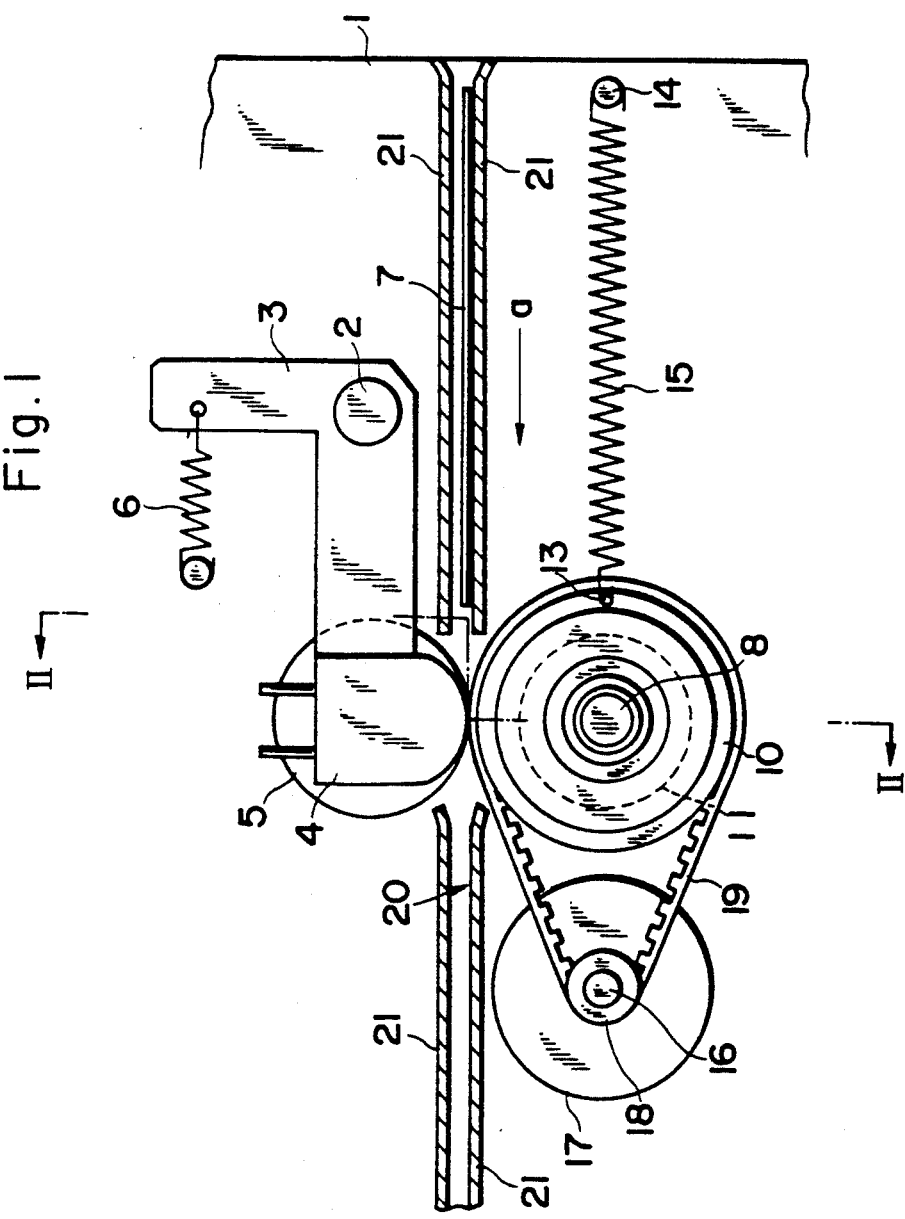
FIG. 1 is a vertical sectional view of a card reader/writer of the manual scanning type.

In FIGS. 1 and 2, a manual conveying path 20 of a magnetic card 7 is constructed by upper and lower guide plates 21. The guide plates 21 are upwardly and downwardly bent at one side of the conveying path 20, thereby forming an elongated groove 22 for scanning the magnetic card when it is seen from the outside. The other side of the path 20 is restricted by a side plate 1. The magnetic card 7 is manually conveyed between the upper and lower guide plates 21 in a state in which one side of the card 7 is in contact with the side plate 1.

Along the card conveying path 20, the upper and lower guide plates 21 contain cutouts to accommodate a magnetic head 4 and a speed governor roller 10 which are respectively arranged in the cut-out portions of the guide plates 21 so as to face the conveying path and to face each other.

An L-shaped arm 3 is swingably attached to the side plate 1 through an arm shaft 2. The magnetic head 4 is attached to one end of the arm 3. A tension roller 5 is rotatably supported on one end of the arm 3. A spring 6 is attached between the other end of the arm 3 and a pin formed on the side plate 1, thereby pressing the magnetic head 4 and tension roller 5 toward the conveying path 20.

A roller shaft 8 is fixed to the side plate 1 below the arrangement position of the magnetic head 4. The speed governor roller 10 is rotatably attached to the roller shaft 8 through bearings 9.

An annular concave portion 11 and teeth 12 for a timing belt are formed on the peripheral surface of the roller 10. A relatively long speed governor spring 15 is reeved between a pin 13 attached to the speed governor roller 10 and a pin 14 provided on one side of the side plate 1 in a state so as to keep a substantial free length such that the spring 15 is not warped by its weight. An increase in rotational speed of the speed governor roller 10 is restricted by the speed governor spring 15.

On the other hand, a wheel shaft 16 is provided for the side plate 1 on the opposite side of the speed governor roller 10 and is located along the same line as roller shaft 8 and pin 14. A flywheel 17 and a timing pulley 18 are rotatably attached to the wheel shaft 16. The flywheel 17 and pulley 18 are integratedly constructed. A timing belt 19 is reeved around the timing pulley 18 and the timing belt teeth 12 of the speed governor roller 10, thereby allowing the flywheel 17 to be rotated in association with the rotation of the speed governor roller 10. A fluctuation in rotation of the roller 10 is prevented by the flywheel 17.

The embodiment shown in the diagrams is constructed as mentioned above and the operation will now be described hereinbelow.

To write or read magnetic recording information onto/from the magnetic card 7, the magnetic card 7 is inserted between the guide plates 21 from the scanning groove 22. The magnetic card 7 is manually conveyed in the direction of an arrow a in FIG. 1 in a state in which one side of the card 7 is in contact with the side plate 1.

When the magnetic card 7 reaches the position between the magnetic head 4 and the speed governor roller 10, the card 7 is sandwiched between the tension roller 5 and the timing belt 19. In this state, when the card 7 is further manually conveyed in the direction of the arrow a, the speed governor roller 10 starts rotating by the frictional force between the card 7 and the belt 19.

The speed governor spring 15 is sequentially stretched as shown in FIGS. 3 and 4 by the rotation of the speed governor roller 10 in association with the manual conveyance of the card 7 in the direction of the arrow a, so that the speed governor spring force gradually increases.

When the magnetic card 7 is further manually conveyed in the direction of the arrow a and the card 7 passes the position between the magnetic head 4 and the speed governor roller 10, the writing or reading operation of the magnetic recording information onto/from a magnetic stripe of the magnetic card 7 is completed. In the reading/writing operation, therefore, it is possible to prevent the situation where the magnetic card 7 is moved manually at a gradually increasing speed by the recovery force of the speed governor spring 15. Also, the fluctuation in the moving speed of the magnetic card 7 by its manual operation, namely, what is called a speed variation can be suppressed by the flywheel 17 which is interlockingly driven by the speed governor roller 10.

Thus, there are advantages such that the magnetic card 7 can be moved at an almost constant conveying speed irrespective differences in the manually applied speed and magnetic recording information can be relatively stably written or read out.

The present invention is not limited to only the construction of the embodiment as mentioned above.

For instance, in place of the speed governor spring 15 constructed by the coil spring mentioned above, a spiral spring whose one end is fixed to the speed governor roller 10 can be also used.

On the other hand, the flywheel 17 can also have a structure such that it is arranged coaxially with the roller shaft 8 on the back surface of the side plate 1. In this case, the roller shaft 8 is rotatably supported to the side plate 1 and the flywheel 17 and the speed governor roller 10 are fixed to the shaft 8.

What is claimed is:

1. A card reader/writer of a manual scanning type comprising:
    a magnetic head supported to face a card conveying path and to be freely movable toward and away from the card conveying path;
    pressing means for pressing said magnetic head towards the card conveying path;
    a rotatable speed governor roller arranged adjacent to the magnetic head and which is rotated in a card conveying direction due to frictional contact of a magnetic card being manually conveyed along the card conveying path with a contact surface provided on said roller; and
    biasing means for biasing the speed governor roller when the speed governor roller is rotated from a rest position in the card conveying direction and providing a biasing force in a direction opposite to the card conveying direction.

2. A card reader/writer according to claim 1, wherein said biasing force of said biasing means increases as an angle of rotation of the speed governor roller increases relative to said rest position.

3. A card reader/writer according to claim 1, wherein said biasing means comprises a speed governor spring in which one end is fixed to a peripheral surface of said speed governor roller and the other end is fixed to a frame of the card reader/writer in order to bias against rotation of said speed governor roller.

4. A card reader/writer according to claim 3, wherein a guide groove for the speed governor spring is formed on the peripheral surface of the speed governor roller.

5. A card reader/writer according to claim 1, further comprising a flywheel which is interlocked in rotation with said speed governor roller.

6. A card reader/writer of a manual scanning type comprising:
    a magnetic head which is movably supported at a position facing a card conveying path so as to be movable toward and away from said card conveying path;
    pressing means for pressing said magnetic head towards the card conveying path;
    a speed governor roller arranged adjacent said magnetic head, said speed governor roller being rotatable by a card which is manually conveyed along said card conveying path and which contacts with a contact surface provided on said roller; and
    a flywheel which is interlocked in rotation with the speed governor roller.

* * * * *